United States Patent
Kincaid et al.

(10) Patent No.: US 7,498,050 B2
(45) Date of Patent: Mar. 3, 2009

(54) EDIBLE SPREAD COMPOSITION AND PACKAGED PRODUCT

(75) Inventors: Carrie Melinda Kincaid, Chicago, IL (US); Peter Begg, Mundelein, IL (US); Sandra Kelly-Harris, Hazel Crest, IL (US); Janet Batz, Palatine, IL (US)

(73) Assignee: Kraft Foods Global Brands LLC, Northfield, IL (US)

( * ) Notice: Subject to any disclaimer, the term of this patent is extended or adjusted under 35 U.S.C. 154(b) by 399 days.

(21) Appl. No.: 10/736,037

(22) Filed: Dec. 15, 2003

(65) Prior Publication Data

US 2005/0129833 A1 Jun. 16, 2005

(51) Int. Cl.
*A23L 1/38* (2006.01)
*B65D 85/72* (2006.01)

(52) U.S. Cl. .................... 426/115; 426/116; 426/633

(58) Field of Classification Search .......... 426/633, 426/115, 116
See application file for complete search history.

(56) References Cited

U.S. PATENT DOCUMENTS

| | | | | |
|---|---|---|---|---|
| 2,723,200 A | * | 11/1955 | Pyenson | 53/432 |
| 2,836,497 A | * | 5/1958 | Levin | 426/116 |
| 2,849,323 A | * | 8/1958 | Young | 426/116 |
| 2,883,286 A | * | 4/1959 | Musser | 426/570 |
| 2,924,570 A | * | 2/1960 | Barr et al. | 208/143 |
| 2,953,284 A | * | 9/1960 | Prussin et al. | 222/402.13 |
| 2,968,628 A | * | 1/1961 | Reed | 516/7 |
| 2,984,570 A | * | 5/1961 | Prell | 222/1 |
| 3,145,113 A | * | 8/1964 | Mordaunt | 426/116 |
| 3,366,494 A | * | 1/1968 | Bower et al. | 426/116 |
| 3,393,842 A | * | 7/1968 | Bruce et al. | 222/386.5 |
| 3,519,440 A | * | 7/1970 | Campbell et al. | 426/116 |
| 3,619,207 A | * | 11/1971 | Dzurik et al. | 426/331 |
| 3,620,763 A | * | 11/1971 | Hans | 426/116 |
| 3,622,354 A | * | 11/1971 | Diamond | 426/116 |
| 3,745,023 A | * | 7/1973 | Greensburg et al. | 426/601 |
| 3,803,333 A | * | 4/1974 | Roudebush | 426/572 |
| 3,849,580 A | * | 11/1974 | Sejpal et al. | 426/116 |
| 3,868,978 A | * | 3/1975 | Knopf | 141/19 |
| 3,920,156 A | * | 11/1975 | Hicks | 222/80 |
| 4,053,647 A | * | 10/1977 | Prussin | 426/92 |

(Continued)

FOREIGN PATENT DOCUMENTS

| | | |
|---|---|---|
| WO | WO 99/21439 | 5/1999 |
| WO | WO 02/094037 | 11/2002 |

OTHER PUBLICATIONS

Higgins, K. 2001. Food Engineering 73(5):22. Everyting old is new again.*
Joslyn, Maynard, 1970. Methods in Food Analysis. Academic Press, New York. p. 201-205.*

*Primary Examiner*—Carolyn A Paden
(74) *Attorney, Agent, or Firm*—Fitch, Even, Tabin & Flannery (57) ABSTRACT

An edible spread composition comprises a homogenous mixture of plant fiber-containing material, edible oil, water, and an effective amount of an emulsifier that prevents separation of oil from the plant fiber and other mixture solids that otherwise occurs in its absence when the edible spread composition is discharged while held under pressure. The edible spread composition may be, for instance, a peanut butter spread composition or a chocolate spread composition. There also is a packaged spread product comprising the edible spread composition that is held inside a pressurized container and dispensed without experiencing oil separation.

24 Claims, 2 Drawing Sheets

U.S. PATENT DOCUMENTS

| | | | |
|---|---|---|---|
| 4,198,439 A * | 4/1980 | Hoover .................. 426/632 |
| 4,518,103 A * | 5/1985 | Lim et al. ................ 222/135 |
| 4,762,725 A | 8/1988 | Player et al. |
| 4,795,650 A | 1/1989 | Groobert |
| 4,801,465 A * | 1/1989 | Sponer .................. 426/116 |
| 5,040,700 A * | 8/1991 | Compton ................ 222/146.5 |
| 5,294,455 A * | 3/1994 | O'Brien et al. ........... 426/573 |
| 5,490,999 A * | 2/1996 | Villagran et al. .......... 426/633 |
| 5,518,755 A * | 5/1996 | Wong et al. ............. 426/633 |
| H1636 H * | 3/1997 | Sevenants et al. ......... 426/633 |
| 5,714,193 A * | 2/1998 | Fix et al. ............... 426/633 |
| 5,942,275 A | 8/1999 | Wong et al. |
| 6,039,999 A * | 3/2000 | Bakshi et al. ............ 426/633 |
| 6,153,238 A * | 11/2000 | Shannon ................ 426/115 |
| 6,173,870 B1 * | 1/2001 | Taylor .................. 222/402.15 |
| 6,287,612 B1 * | 9/2001 | Mandava et al. .......... 426/120 |

\* cited by examiner

EDIBLE SPREAD COMPOSITION AND PACKAGED PRODUCT

FIELD OF THE INVENTION

The present invention generally relates to food products, and, in particular, an edible plant fiber and oil-containing spread composition, and a packaged spread product including the spread composition that is stored and dispensed under pressure without significant oil separation.

BACKGROUND OF THE INVENTION

Oil separation in food products stored at room temperature, such as peanut butter, is undesirable, as it may adversely impact organoleptic properties of the products such as attributes of appearance, mouthfeel and/or taste. For instance, the loss of oil through separation not only may be considered unsightly to many consumers, but also can lead to drying out of the peanut butter, making its less palatable. Emulsifiers have been conventionally used to stabilize peanut butter during storage against separation of oil from the peanut fiber in peanut butter. Monoglycerides and diglycerides, for instance, have been used as such emulsifiers in peanut butter. In actual practice, however, these usages of emulsifiers in conventional peanut butters have involved peanut butter products stored at or near ambient pressure conditions.

U.S. Pat. No. 4,198,439 discloses a nut cheese product composed of ground roasted nuts, texture-modifying fat and dehydrated cheese, and having a water activity below about 0.70, and which is indicated as being suitable as a spread for snacks, and which can be stored for extended periods of time without refrigeration. The '439 patent indicates emulsifiers may be used in the nut cheese product, such as glycerides and lecithin. The '439 patent indicates that the emulsifier improves the product, but in some instances it is not absolutely necessary. The '439 patent also indicates that the product is suitable for use in a number of different products including whole wedges or blocks, slices, sandwich spreads, balls, and in pressurized or aerosol cans, although no working example is disclosed for at least the latter suggested application.

The use of pressurized cans to store and dispense edible food compositions has been practically implemented, most notably in certain soft process cheese products and artificial whipped cream dessert topping products. These pressurized soft products are typically used for garnishing other food items. For example, EASY CHEESE® process cheese spread has been commercially packaged in containers from which it is discharged through an opening in the container in a bead-like form. The discharged product beads have been shaped using a slotted nozzle tip to impart a decorative shape to the extruded stream of cheese product. A pressure differential is present between the interior of the pressurized can and the surrounding atmosphere outside the can. When the exposed tip of the can is bent from its normal position, the pasteurized process cheese is forced out of the can through the nozzle as a product stream as a higher pressure force is present inside the can relative to the ambient atmospheric pressure outside the can. These soft cheese products can thereby be extruded as a stream of soft product onto crackers or other food items. Additionally, DREAM WHIP® dessert topping products also are dispensed from aerosol cans as a stream of edible soft foam-like product.

However, such process cheese and whipped dessert topping products are smooth non-fibrous foods. Previously, problems associated with pressurized storage of more complicated food compositions, especially those containing mixtures of oils and high fiber content during extended storage periods, have prevented the production of such products in pressurized forms. Consequently, edible spread compositions have not been previously formulated appropriately to meet the special challenges of oily fibrous products when packaged under positive pressures.

There remains a need for new approaches that will provide stable storage for oily fibrous food products where held under constant pressure during their shelf life. The present invention fulfills these, as well as other needs and objectives, as will be apparent from the following description of embodiments of the present invention.

SUMMARY OF THE INVENTION

This invention provides new edible plant fiber and oil-containing spread compositions, and also packaged spread products including it, in which the spread compositions can be held under positive pressure inside a container without experiencing significant separation of oil from plant fiber or other solids content when expelled from the container. In addition, the plant fiber and oil-containing spread compositions are formulated to be shelf life stable despite a high water activity and high pH.

The suppression of oil separation is maintained throughout a useful shelf life of pressurized edible spread compositions of this invention. The fiber and oil-containing spread compositions have rheological properties at room temperature conditions by which they may be contained in and expelled from a pressurized container in which they are packaged.

In one embodiment, the edible spread composition comprises, as a homogenous mixture, about 10 to about 45 percent plant fiber-containing material, about 0.5 to about 10 percent edible oil, about 10 to about 60 percent water, and a sufficient amount of an emulsifier that inhibits the edible oil from separating from the mixture when the mixture is put under a positive pressure until discharged.

In one particular embodiment of this invention, the plant fiber and oil-containing spread composition is a peanut spread composition (i.e., the plant fiber-containing material is peanut butter). Peanut spread compositions of this invention preferably look and taste very similar to peanut butter, but avoid oil separation problems when placed under pressure.

The plant fiber content of the peanut spread compositions comprises peanut fiber, although other sources of plant fiber may also be present. The oil present in the peanut spread composition may be present as an oil component of the peanut butter ingredient, or as an edible oil that is separately included in the composition, or as a combination of both of these sources of oil.

In one particular embodiment, the emulsifier, which when present in effective amount inhibits oil separation in a plant fiber and oil-containing spread composition contained in and expelled from a pressurized container, comprises diacetyl tartaric acid esters of monoglycerides. In another particular embodiment, such an emulsifier comprises polyoxyethylene-(20)-sorbitan-monostearate. In one particular embodiment, an edible peanut spread composition of this invention comprises at least 10 percent peanut butter, and an emulsifier provided as (I) at least about 0.05 and preferably at least about 0.2 percent diacetyl tartaric acid esters of monoglycerides, or (ii) at least about 0.05 and preferably at least about 0.1 percent polyoxyethylene-(20)-sorbitan-monostearate, or (iii) a combination of these emulsifiers in an effective amount.

In one embodiment, the edible peanut spread composition comprises, as a homogenous mixture, about 10 to about 45 percent peanut butter, about 0.5 to about 10 percent edible oil, about 10 to about 60 percent water, and the oil-separation inhibiting emulsifier in an effective amount for that purpose. In another particular embodiment, the peanut spread compositions comprise about 10 to about 45 percent peanut butter, about 1 to about 20 percent dairy protein concentrate, about 0.05 to about 2 percent of the oil separation-inhibiting emulsifier as described herein, about 0.5 to about 10 percent edible oil, about 5 to about 15 percent sweetener, and about 10 to about 60 percent water. The peanut spread composition as formulated herein generally has a density greater than about 1.05 g/ml; preferably, the density is in the range of about 1.15 to about 1.3 g/ml. If desired, densities higher or lower than these ranges can be used.

In another embodiment, the plant fiber and oil-containing spread composition contains chocolate liquor as the plant fiber-containing material. In a particular embodiment, the chocolate liquor based spread compositions also include sweeteners and dairy products that introduce dairy protein, fat, lactose, or combinations thereof, to adjust the organoleptic and rheological properties of the spread to provide chocolate like attributes. In particular, by combining chocolate liquor with dairy product and sweetener in the spread composition, a chocolate spread may be provided that is highly resistant to oil separation. The oil separation-inhibiting emulsifiers described herein are likewise useful to inhibit oil separation in chocolate spread compositions when they are contained in and expelled from a pressurized container. In a particular embodiment, the edible chocolate spread composition comprises, as a homogenous mixture, about 10 to about 45 percent chocolate liquor, about 0.5 to about 10 percent edible oil, about 10 to about 60 percent water, and an emulsifier of a type and in an amount effective to prevent oil content from separating from the remainder of the mixture when the mixture is discharged from a container while under container pressure. For purposes of the chocolate spread composition, the edible oil may be cocoa butter oil derived from the chocolate liquor under the product usage conditions of this invention, or an oil added to the composition apart from the chocolate liquor ingredient, or a combination of both of these sources of edible oil.

In a more particular embodiment, the chocolate spread compositions comprise about 10 to about 45 percent chocolate liquor, about 0.05 to about 2 percent of the oil separation-inhibiting emulsifier as described herein, about 1 to about 25 percent total dairy products, about 5 to about 20 percent sweetener, and about 10 to about 60 percent water.

In another embodiment of the invention, there is a packaged food product comprising a container having a first chamber for an edible plant fiber and oil-containing spread composition as described herein that is held under pressure without the spread composition experiencing oil separation during discharge from the container. A propellant is placed in a second chamber in the container to provide the discharge force needed when a consumer desires to dispense the spread product from the container.

In one particular embodiment, this packaged food product includes a hollow cylindrical body having opposite longitudinal ends and a floating plunger slidably arranged inside the cylindrical body. The floating plunger is a barrier that separates a pressurized gas-containing chamber from an edible plant fiber and oil-containing spread composition-containing chamber. The pressurized gas creates a pneumatic pressure force against a side of the floating plunger opposite to the edible spread composition-containing chamber. A closure member included at one longitudinal end of the container has a valve defining a passageway extending from the edible spread composition-containing chamber to an outside atmosphere. The closure member has a normally closed position to prevent flow of edible spread composition through the valve, but when actuated opens the valve to discharge the edible spread composition.

In a further embodiment, the container further includes a dome-shaped top section attached to the longitudinal end of the cylindrical body defining the composition-containing chamber. When the valve of the closure member is tilted from its normal upright position, edible spread composition is discharged from the container through the valve. When the tilting force is discontinued, the valve returns to its normally closed position. The container also has a bottom section attached to the opposite longitudinal end of the cylindrical body that defines the pressurized-containing chamber. The bottom section includes a closure mechanism that seals an opening through which pressurized gas has been introduced into the pressurized gas-containing chamber of the container.

In one embodiment, positive pressure is applied constantly to the plant fiber and oil-containing spread composition during all or substantially all its shelf life while packaged inside a pressurized container. Oil separation from the plant fiber and other solids content of the spread composition is absent despite a constant positive pressure exerted upon the edible spread composition due the presence of a propellant inside the same container.

The positive gas pressures provided in the containers for holding the spread compositions according to embodiments of this invention generally range from about 10 to about 150 psig, particularly from about 20 to about 140 psig, and more particularly from about 40 to about 120 psig.

In another embodiment, the packaged spread product is transported, stored, and dispensed at ambient temperature conditions that may range from about 0 to about 120° F. under such positive pressure conditions without oil separating from the fiber content of the edible spread composition. While end users will more typically store and dispense this type of product at room temperatures of about 65 to about 80° F., the product is also designed to tolerate more extreme shipping and handling conditions without oil separation problems arising.

For purposes of this invention, "significant separation of oil," which is avoided in the present invention is intended to mean no more than about 10 percent, preferably no more than about 5 percent, and most preferably no more than about 1 percent, of the total oil separates from the edible spread composition. Also as used herein in the context of the packaged spread products, oil-fiber "separation" is characterized by an initial discharge of a significant amount of oil (and no fiber) from a pressurized container holding a food composition comprising solids and oil, when the container's nozzle is depressed to expel container contents. An "oil" is edible fat in a liquid state. For purposes herein, a "homogenous mixture" is a food composition that does not undergo such separation, and instead oil and fiber contents of such a mixture are both present in the initial discharge from the pressurized container when the nozzle is depressed. A "positive pressure force" refers to a pressure force greater than that of atmospheric pressure.

Features, dimensions, and sizes depicted in the figures are illustrative only, and are not necessarily drawn to scale.

DETAILED DESCRIPTION

The present invention generally relates to the manufacture and use of an edible spread composition containing plant fiber and oil, and a packaged food product including the edible spread composition. In the embodiments described herein, the spread composition is held under pressure inside a container without experiencing unacceptable separation of oil from the plant fiber and other solids content of the spread composition. The lack of oil separation is confirmed upon observing the initial discharge of spread product dispensed from the container.

The spread composition generally comprises a homogenous mixture including plant fiber-containing material, edible processing oil, water, and an effective amount of an emulsifier that prevents significant separation of the oil from the solids for a storage period corresponding to a practically useful shelf life, such as at least about 12 weeks, and particularly at least about 36 weeks. The extended shelf lives obtainable are noteworthy in light of the relatively high water contents of the spread compositions of this invention.

This prevention of oil separation from the solids content of the edible plant fiber and oil-containing spread composition is provided at positive pressure conditions within a holding container that exceed atmospheric pressure and that make it possible to expel the spread composition out of the container at a practical rate. The positive pressures provided in pressurized containers holding the spread compositions according to embodiments of this invention generally range from about 10 to about 150 psig, particularly from about 20 to about 140 psig, and more particularly from about 40 to about 120 psig. Higher pressures may also be used with cans whose walls and bottoms are designed to withstand stress.

In one embodiment, a packaged spread product containing an edible plant fiber and oil-containing spread composition as described herein is transported, handled, and stored at ambient temperature conditions which can generally range anywhere from about 0 to about 120° F. without the pressurized food product experiencing separation of its oil content from its solids content. While end users will more typically store this type of product at room temperatures of about 65 to about 80° F., the product is also designed to tolerate extreme shipping and handling conditions. The spread composition preferably is in a flowable state under these packaging and dispensing conditions so that it can be effectively discharged from the container on demand, at least until the contents of the can are substantially emptied. Other details on the edible spread composition and packaged versions of it will be presented below. First, a description of the edible spread composition that can be used as the food component that is filled into the pressurized containers is provided.

Edible Spread Compositions. An essential property of the edible spread compositions of embodiments of this invention is that they do not experience oil separation from the plant fiber and other solids content of the edible spread compositions while put under pressure in and discharged from a pressurized container. Conventional peanut butter and chocolate liquor products, for instance and by contrast, become more susceptible to oil separation from their solids content when subjected to high pressure compressive force.

In one embodiment, the edible spread composition comprises, as a homogenous mixture, about 10 to about 45 percent plant fiber-containing material, about 0.5 to about 10 percent edible oil, about 10 to about 60 percent water, and a sufficient amount of an emulsifier that inhibits the edible oil from separating from the mixture when the mixture is put under a positive pressure until discharged. The new edible spread compositions according to this invention can be packaged in pressurized containers for subsequent dispensing from the containers on demand in a useful and pleasing manner for consumers free of separated oil.

Peanut Spread Compositions. In one embodiment, the edible spread compositions of this invention preferably include peanut butter as one primary ingredient. The peanut butter ingredient may be prepared, such as in a conventional manner, by fine grinding of peanuts, such as raw or roasted peanuts, until a creamy consistency is provided. In one embodiment, the peanut butter ingredient may have a formulation comprising a major amount of ground peanuts, and a minor amount of additives commonly used in peanut butters such as peanut butter sweeteners (e.g., sugar, honey, corn syrup), stabilizers (e.g., hydrogenated seed oil blends, or a rapeseed oil and erucic acid combination), emulsifiers (e.g., monoglycerides and diglycerides), and salt, and so forth.

In one embodiment, the peanut spread compositions of this invention contain a substantial amount of water and edible processing oil, which is blended with the peanut butter. Edible processing oil is included in the spread composition as a texture modifying agent. The processing oil can be peanut oil, vegetable oil, soybean oil, including non-hydrogenated and partially hydrogenated oils, and so forth, or combinations thereof. Peanut oil is preferred because it also adds a desirable flavor that is consistent with the product. Water can be added in liquid form and/or as steam.

An emulsifier is included in the composition that prevents or significantly reduces oil separation from the solids content of the food mixture under positive pressure conditions. In one embodiment, the emulsifier comprises diacetyl tartaric acid esters of monoglycerides, which are commercially available; one specific example is PANODAN® DATEM, supplied by Danisco. They have been commercially marketed for use in bakery goods. In another embodiment, the oil separation-inhibiting emulsifier comprises polyoxyethylene-(20)-sorbitan-monostearate (available under the commercial trade name Polysorbate-60).

In one aspect, the edible peanut spread composition comprises, as a homogenous mixture, 1) at least about 10 percent peanut butter, 2) at least about 10 percent water, 3) at least about 1 percent edible processing oil, and 4) and an emulsifier of a type and in an amount effective to prevent oil content from separating from the remainder of the mixture when the mixture is put under a positive pressure. In one preferred embodiment, such an emulsifier is selected from diacetyl tartaric acid esters of monoglycerides or polyoxyethylene-(20)-sorbitan-monostearate, or a combination thereof. The diacetyl tartaric acid esters of monoglycerides are generally is used in an amount of at least about 0.05 percent, and particularly at least about 0.2 percent, while the polyoxyethylene-(20)-sorbitan-monostearate generally is used in an amount of at least about 0.05 percent, and particularly at least about 0.1 percent, although these respective amounts may vary depending on the overall formulation.

The peanut spread compositions of embodiments of this invention also can contain other ingredients and additives to enhance their processability, flavor, or stability. Other additives can be included to the extent they do not introduce objectionable flavors or adversely impact the rheology or processability of the peanut spread composition.

For instance, dairy protein concentrate can be included to increase protein content and flavor of the spread compositions as well as to control the texture of the product. Such dairy protein concentrates include one or more of whey protein concentrates, milk protein concentrates, milk protein isolates, casein, and so forth, and combinations thereof. Supplemental emulsifiers optionally may be used to the extent they do not destabilize the product. For instance, lecithin generally should not be included as it destabilizes the spread compositions of this invention.

Flavoring ingredients may be added. For example, salt can be added in minor amounts. Also, a sweetener can be added to the spread composition. The sweetener preferably is a carbohydrate-based sweetening material including mono-, di-, and polysaccharides and their derivatives. Examples of the sweetener include, for example, sucrose (sugar), fructose, corn syrup, corn syrup solids, corn sweetener, honey, molasses, malt syrups, starches, lactose, dextrose, maltose, maltodextrins, individually or in any combinations thereof. In addition to their flavoring characteristics, added salt and/or sugar may also contribute to the microbial stability of the composition.

A thickener can be included. A suitable thickener, for example, is sodium or potassium alginate (sodium or potassium polymannuronate). Acidity control agents can be included, such as monosodium phosphate, disodium phosphate, and combinations thereof. Antimicrobial agents, such as sorbic acid, also can be included in effective amount. Coloring agents, such as caramel color, titanium dioxide, and so forth, can be included in the spread composition individually or in combinations thereof.

The peanut spread compositions of embodiments of this invention look and taste very similar to peanut butter but avoid the oil separation problems encountered by conventional peanut butter when put under pressure. In addition, the peanut spread compositions are formulated to be shelf life stable despite a high water activity and high pH.

To prepare the spread composition, the peanut butter, water, processing oil, emulsifier, and any other ingredients or additives, are combined and admixed under low shear until a flowable homogenous mixture is obtained. It is generally preferred that the emulsifier and the water be mixed together before the peanut butter (and peanut oil if used) is added in other to increase the stability of the final composition. A thermal heat process can be, and preferably is, used to further control vegetative microorganisms. Thus, for example, it is generally preferred that the composition be heated to about 190° F. for about 1.1 minute or more in order to ensure that essentially all vegetative microorganisms as well as one log of non-proteolytic *Clostridum botulinum* spores are destroyed. Of course, other time and temperature combinations can be used if desired as indicated in the following table:

| TEMPERATURE | MINIMUM TIME (minutes) |
| --- | --- |
| 162° F. (72.2° C.) | 40.0 |
| 170° F. (76.7° C.) | 14.2 |
| 175° F. (79.4° C.) | 7.6 |
| 180° F. (82.2° C.) | 4.0 |
| 185° F. (85.0° C.) | 2.1 |
| 190° F. (87.8° C.) | 1.1 |
| 195° F. (90.5° C.) | 0.6 |
| 198° F. (92.2° C.) | 0.4 |

A stainless steel kettle adapted for steam injection can be used to conduct the ingredient-mixing operation. Steam can also be injected into the mixture during blending to aid processing. In one preferred embodiment, part of the water is added to the peanut spread composition as liquid water into which the dairy concentrate has been dispersed, and the remainder is introduced as steam injected into a blender in which the peanut spread ingredients have been added and are mixed into a homogenous composition. Once admixed, the resulting homogenous peanut spread composition is fed to a packaging line where it is filled into pressurized containers, described in more detail hereinafter.

In one embodiment, the edible peanut spread composition comprises, as a homogenous mixture, about 10 to about 45 percent peanut butter, about 0.5 to about 10 percent edible oil, about 10 to about 60 percent water, and the oil-separation inhibiting emulsifier in an effective amount for that purpose. In a more particular embodiment, the peanut spread composition that can be packaged under positive pressure for extended periods without experiencing oil separation comprises about 10 to about 45 percent peanuts, about 1 to about 20 percent dairy protein concentrate, about 0.05 to about 2 percent of the oil separation-inhibiting emulsifier as described herein, about 0.5 to about 10 percent edible oil, about 5 to about 15 percent sweetener, and about 10 to about 60 percent water.

The peanut spread composition should have rheological properties at room temperature conditions by which it may be filled into, and contained in and expelled from the container. In one embodiment, the peanut spread composition as formulated herein generally has a density greater than about 1.05 g/ml; preferably, the density is in the range of about 1.15 to about 1.3 g/ml. If desired, densities higher or lower than these ranges can be used.

Chocolate Spread Compositions. In another embodiment, the plant fiber and oil-containing spread composition is a chocolate spread composition. The herein-described oil separation-inhibiting emulsifiers selected from the diacetyl tartaric acid esters of monoglycerides or polyoxyethylene-(20)-sorbitan-monostearate, or a combination thereof, are likewise useful in inhibiting oil separation in chocolate-liquor containing spread compositions when they are contained in and expelled from a pressurized container.

Chocolate liquor is a commercially available product. Chocolate liquor, for purposes herein, refers to the dark brown paste obtained by grinding cocoa beans nibs (i.e., the center or pulp of the cocoa beans) to a smooth, liquid state. Cocoa beans are found in the pods of the cacao tree, *Theobroma cacao*. Cocoa beans contain plant fiber and fat content. Cocoa beans are fermented, dried, roasted, and cracked (fragmented) to provide cocoa nibs for the grinding of chocolate liquor. The grinding process extracts approximately half the cocoa butter content of the cocoa nibs while leaving approximately the same amount (e.g., about 50 to about 58 percent) behind in the chocolate liquor product. Cocoa butter is the natural, cream-colored vegetable oily fat present in cocoa nibs. In the food industry, cocoa butter is extracted from chocolate liquor by application of high pressure in a press or by filter pressing chocolate liquor, to separate cocoa butter oil from a solid residue from which cocoa powder is formed.

The plant fiber content of the chocolate spread compositions comprises cocoa bean fiber from the cocoa beans from which the liquor is derived, although other sources of plant fiber may also be present. Any oil in the chocolate spread composition is derived from via the natural fatty acid content of the cocoa beans from which the liquor is obtained, or via an edible oil separately added to the composition, or from both sources. Under the highly pressurized can conditions, the oil separation emulsifiers included in the spread composition inhibit cocoa butter present in the chocolate liquor from liquefying into an oil form that initially discharges from the can nozzle when it is actuated. In a more particular embodiment, the chocolate spread compositions also may include dairy products that introduce dairy protein, fat, lactose, or combinations thereof, to adjust the organoleptic and rheological properties of the spread.

In a particular embodiment, the edible chocolate spread composition comprises, as a homogenous mixture, about 10 to about 45 percent chocolate liquor, about 0.5 to about 10 percent edible oil, about 10 to about 60 percent water, and an emulsifier of a type and in an amount effective to prevent oil content from separating from the remainder of the mixture when the mixture is held and discharged under pressure. In a more particular embodiment, the chocolate liquor spread compositions comprise about 10 to about 45 percent chocolate liquor, about 0.05 to about 2 percent of the oil separation-inhibiting emulsifier as described herein, about 1 to about 25 percent total dairy products, about 5 to about 20 percent sweetener, and about 10 to about 60 percent water.

It also will be appreciated that the terminology "chocolate liquor" generally covers adding it as such to the spread formulation, or as reconstituted in situ by adding cocoa butter and cocoa powder as separate ingredients to the spread formulation and intermixing them and the other ingredients until a homogenous mixture is obtained.

The chocolate-liquor containing compositions of embodiments of this invention also can contain other ingredients and additives to enhance their processability, flavor or stability of the composition, including those described previously in connection with the peanut spread compositions. Other additives can be included to the extent they do not introduce objectionable flavors or adversely impact the rheology or processability of the spread composition.

The chocolate spread composition as formulated herein generally also has a density greater than about 1.05 g/ml; preferably, the density is in the range of about 1.15 to about 1.3 g/ml. If desired, densities higher or lower than these ranges can be used for this spread composition.

The chocolate spread compositions are prepared in essentially in the same manner as the peanut spread compositions described above except, of course, the chocolate component is used in place of the peanut component. Thus, to prepare the chocolate spread composition, the chocolate component, water, processing oil, emulsifier, and any other ingredients or additives, are combined and admixed under low shear until a flowable homogenous mixture is obtained. It is generally preferred that the emulsifier and the water be mixed together before the chocolate component is added in other to increase the stability of the final composition. A thermal heat process can be, and preferably is, used to further control vegetative microorganisms using the same general guidelines as provided above for the peanut spread composition.

Figure 1:
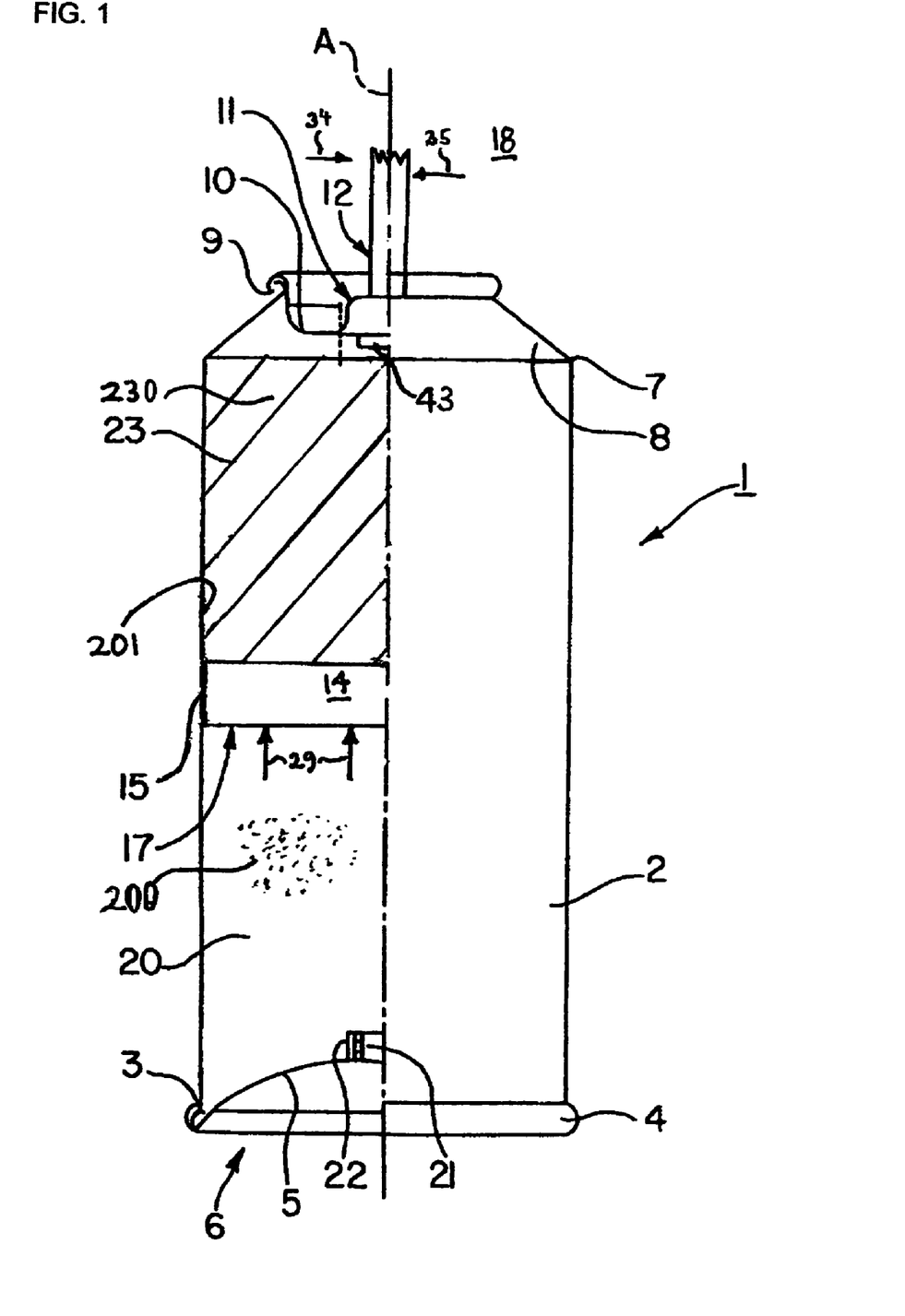
FIG. 1 schematically shows a packaged product including an edible spread composition according to an embodiment of this invention in partial cross section.

Packaged Spread Product. Referring to FIG. 1, in an embodiment of the invention, there is packaged spread product that stores and dispenses plant fiber and oil-containing spread compositions as described and otherwise contemplated herein under pressure. As shown, the packaged spread product comprises a container 1 including a hollow cylindrical body 2 having opposite longitudinal ends 4 and 7. The cylinder 2 can be a rolled sheet metal construction, such as aluminum or steel sheeting. The material of the container 1 may comprise other materials such as strengthened plastic, so long as they are strong enough to contain the pressure in a filled pressurized can. In one embodiment, a metal can having a wall thickness generally of about 0.0045 to about 0.008 inch is used.

In this illustration, the container 1 further includes a frustoconical or dome-shaped top section 8 attached to the upper end 7 of the cylindrical body 2 defining a chamber 23 which contains the edible spread composition, such as the peanut or chocolate spread composition described herein. A rim 9 of the dome section 8 encircles a central opening into which a closure mechanism 11 is installed.

The closure mechanism 11 includes a valve 12 that has a passageway extending from the edible spread composition-containing chamber 23 to an outside atmosphere 18. The closure member 11 has a normally closed position to prevent flow of edible spread composition 230, viz., the spread composition described herein, from chamber 23 through the valve 12, but when actuated, opens the valve 12 to discharge the edible spread composition 230 out of the can 1.

Figures 2, 3:
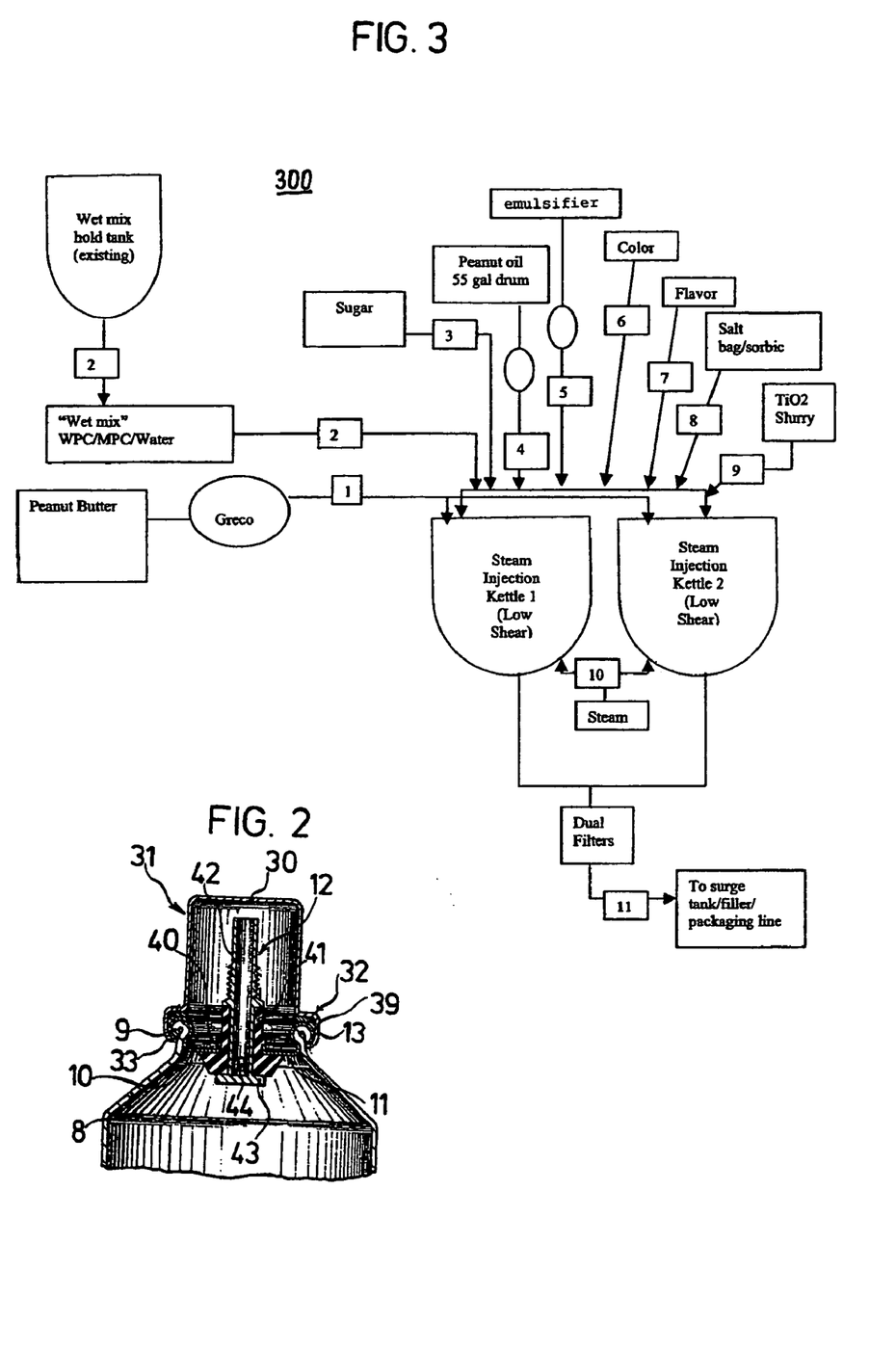
FIG. 2 shows the upper end of the packaged product of FIG. 1 in cross-section and enlarged.
FIG. 3 is a process flow diagram for making a peanut spread product according to one embodiment of the invention.

Referring to FIG. 2, in one embodiment, the closure mechanism 11 comprises a disc 10 (preferably metal), whose rim 13 is crimped around the rim 9 of dome 8. The disc 10 has a central opening 40, in which a plug-like rubber seal 41 of a valve 12 is set. The valve body 42 is tube-shaped and is closed at its interior end with a valve disc 43, which lies pressed against the rubber seal under the influence of interior pressure. Under the valve disc 43 and within the tube sealed on the outside are one or more openings 44, through which the can contents escape when the valve body 42 is tilted away from the cylinder's longitudinal axis A (see FIG. 1), thus disengaging the valve disc 43 and permitting flow of edible spread composition 230 through opening 44 and valve body 42 of valve 12. As illustrated in FIG. 1, the tilting force 34 or 35 applied to valve 12 includes a force component generally perpendicular to the can's longitudinal axis A. The tilting force typically is applied manually by a consumer's hand. When the tilting force is discontinued by the consumer, the valve body 42 returns to its upright normally closed position that generally aligns with the can's longitudinal axis A. As also shown, the container 1 can include a cap 31 having a rim 32 which is placed about the closure 11, i.e., about the crimped edge of the disc 10 and therefore about the edge 9 of the dome 8. The rim 32 has an edge 33 which lies under the plate edge and in this way locks the cap 31 axially. The cap 31 has a top surface 30 arranged such that the valve 12 of the inner seal is positioned out of contact below it.

A floating plunger 14 is slidably arranged inside the cylindrical body 2. The plunger 14 separates a propellant-containing chamber 20 from a separate chamber 23 within cylinder 2 that is filled with an edible spread composition 230. In this illustration, chamber 20 contains a pressurized gas 200 creating a generally constant positive pneumatic pressure force 29 against the underside 17 of the floating plunger 14, which is opposite to the edible spread composition-containing chamber 23. Plunger 14 is a disc-shaped member in this non-limiting illustration. As will be appreciated, the gas pressure force created within chamber 20 may fluctuate with ambient temperature changes. In one embodiment, a positive pressure is constantly applied against the underside of plunger 14 by gas 200, even if its magnitude may fluctuate slightly with small storage temperature changes that may be encountered during storage of the packaged product.

The dimensions of the plunger 14 and the cylinder's inner wall 201 are selected such that the peripheral side edge 15 of plunger 14 can seals against the peripheral inner side wall 201 of the cylinder, yet the plunger 14 is free to move without sticking in the direction of the can's longitudinal axis A. A seal can be provided between the peripheral side edge 15 and the inner wall 201 of the can cylinder 2, or a distance can be set between the plunger side edge 15 and the cylinder wall 201 in such a way that a film seal is formed in this interstice by the entry of product component from chamber 23. The peripheral side edge 15 of the plunger optionally could include a partially embedded O-ring (not shown) which engages the cylinder wall 201 and accommodates sliding motion of the plunger 14 along the side wall 201.

In its rest position, the plunger 14 is pressed against the food composition 230 located above it in chamber 23 by the pressurized gas that fills chamber 20. The pressurized gas 200 creates a constant pressure force 29 on the edible spread composition 230 that fills chamber 23, as applied via intervening plunger 14. When the valve 12 is activated and an opening to the surrounding atmosphere 18 is created in the dome section 8, the pressure force 29 applied on plunger 14 by the pressurized gas in chamber 23 drives the plunger along with the food component 230 upward in the direction of valve 12 to expel a stream of the edible spread composition 230 out of the valve 12. The expulsion of the edible spread composition out of valve 12 continues as long as the valve 12 is actuated and sufficient pressurized gas and food composition remains in the can to support this dispensing function. The plunger 14 ultimately reaches its end position, in which the plunger top 26 abuts against the dome 8, and no further expulsion of any edible spread composition 230 remaining in the dome 8 will occur.

The container 1 also has a bottom section 6 attached to the opposite longitudinal end 4 of the cylindrical body 2 that defines the pressurized-containing chamber 20. The lower rim 3 of cylinder 2 is flanged with the rim 4 of bottom section 6 pushed in at dome or recess section 5. The bottom dome section 5 includes an opening 21. This opening is used to introduce pressurized gas into the pressurized gas-containing chamber 20 of the cylinder 2. After filling chamber 20 with pressurized gas 200 in this manner, a plug 22 seals opening 21.

When filling the can, the edible spread composition 230 is introduced into the upper chamber 23 of can 1 while it is still open at that end. The plunger 14 is installed inside the cylinder 2 before filling the chamber 23 above the plunger 14 with the edible spread composition 230. After flanging the rim of the disc 10 around rim 9, the can 1 is closed in an air tight manner at its upper longitudinal end. Pressurized gas is placed into the lower chamber 20 with the aid of a filling needle inserted through opening 21. The pressurized gas can be any gas that can be stably pressurized and is inert to the food composition stored in the can. The pressurized gas can be, for example, air, carbon dioxide, nitrogen, and combinations thereof, and so forth.

Once the necessary pressure has been achieved in the pressurized gas chamber 20, the filling needle is removed, after which a sealing plug 22 or similar device is used to close and seal opening 21 in an air tight manner. Alternatively, a one-way filling valve can be installed in bottom dome 5 to seal opening 21. Then, the can 1 is ready for use. The container 1 should be sealed in a sufficiently air tight manner such that the pressurized gas does not leak out of the container.

Although the use of an inert gaseous propellant as the pressure-generating agent in the containers is preferred, the invention is not limited thereto. For instance, other types of propellants may used in the pressure-generating chamber of the container, such as liquified gas propellants or aerosol systems. Liquified gas propellants vaporize when the container valve is opened to create the upward force on the plunger within the container used to expel the food product through the container valve. Alternatively, an aerosol propellant system could be used.

The initial relative volumes occupied by pressurized chamber 20 and food component chamber 23 may vary depending on the propellant used and the rheological properties of the food component. By way of illustration and without desiring to be limited, where the propellant is a compressed gas, the gas-containing chamber may occupy about ⅕ to about ⅖ of the total initial interior volume of cylinder 2. On the other hand, where the propellant is in the form of liquified gas, the pressure chamber may occupy only about ¹/₁₀ to about ¹/₅₀ of the total initial volume of the can. As will be understood, as more and more food component is dispensed out of the container, the at rest position of plunger 14 will continue to move toward the dome 8.

As will be appreciated, the container 1 may be held in many different possible spatial orientations when used by a consumer to dispense the edible spread composition 230, i.e., the peanut butter spread composition, out of the container. For instance, the consumer typically may hold the container in a tilted manner such that the valve 12 is tipped downward toward a food product that the consumer desires to garnish with the edible contents of the container 1. Thus, use of terms such as "top", "bottom", "upper", "lower", "upward", "downward", and so forth herein are used merely for sake of convenience in illustrating an embodiment of the invention, and they are not limiting.

In one embodiment, the peanut spread composition, after being packaged in a pressurized can as described herein, is used to garnish other foods. For example, the peanut spread composition can be dispensed onto sandwich bread slices, or crackers, or on or in other foods. The chocolate-liquor spread composition, for example, can be used to garnish or fill pastries, pies, cakes, cookies, ice cream, or other desserts, as well as on or in other foods. Both types of spreads are discharged from pressurized containers upon depressing the dispensing nozzle as a coherent bead of material without oil separation.

Although the edible spread compositions have been illustrated herein as packaged in pressurized cans where the ability to prevent oil separation is highlighted, it nonetheless will be appreciated that they also can be packaged and used in other manners. For example, any of the spread compositions described herein could be packaged in a wide-mouthed container, in which a spread composition is held under near ambient pressure conditions until used by a consumer, who can scoop or otherwise remove the spread composition from the container.

The Examples that follow are intended to illustrate, and not to limit, the invention. All percentages used herein are by weight, unless otherwise indicated.

EXAMPLES

Example 1

Three peanut spread compositions, designated peanut spread compositions 1, 2, and 3, were prepared having the formulations indicated in Table 1.

TABLE 1

Peanut Spread Compositions 1-3

| | Amount (%) | | |
|---|---|---|---|
| Ingredient | Composition 1 | Composition 2 | Composition 3 |
| peanut butter | 40.0 | 40.0 | 25.0 |
| whey protein concentrate (34% protein) | 0 | 0 | 7.3 |
| whey protein concentrate (80% protein) | 1.2 | 0 | 0 |

TABLE 1-continued

Peanut Spread Compositions 1-3

| Ingredient | Amount (%) | | |
|---|---|---|---|
| | Composition 1 | Composition 2 | Composition 3 |
| milk protein concentrate (70% protein) | 7.4 | 8.0 | 10.0 |
| sodium alginate | 0.1 | 0 | 0 |
| monosodium phosphate | 0.5 | 0.5 | 0.5 |
| disodium phosphate | 2.4 | 2.4 | 2.4 |
| titanium dioxide slurry[1] | 0.2 | 0.2 | 0.2 |
| sorbic acid | 0.3 | 0.3 | 0.4 |
| salt | 0.5 | 0.5 | 0.4 |
| Emulsifier (PANODAN ® DATEM) | 0.5 | 0.5 | 0 |
| Emulsifier (Polysorbate 60) | 0 | 0 | 0.5 |
| peanut oil | 2.3 | 1.1 | 4.3 |
| caramel color | 0.2 | 0.2 | 0.3 |
| sugar | 8.0 | 9.0 | 10.0 |
| peanut flavor | 0.1 | 0.1 | 0.1 |
| water and steam | 36.3 | 37.2 | 38.6 |
| | 100 | 100 | 100 |

[1]Slurry is about 50.0 percent $TiO_2$, about 46 fractionated coconut oil, and about 3.5 percent soy lecithin.

The general processing scheme 300 used for making these peanut spread compositions is schematically illustrated in FIG. 3. This process scheme was conducted in a continuous mode with product recirculation to aid in mixing. The appropriate protein concentrate and water was heated in a kettle to about 172° F. The salt bag (monosodium phosphate, disodium phosphate, sorbic acid, and salt), and emulsifier were then added with mixing. It is generally preferred that the emulsifier, as well as the salt bag, are added prior to the addition of the peanut butter in order to increase the stability of the final product. With the temperature still about 172° F., the peanut butter is added. After adding sugar, peanut oil, and remaining ingredients, the temperature was raised to about 190° F. using steam injection and held for at least about 60 seconds in order to prevent or significantly reduce the growth of microorganisms that might be present.

The resulting peanut spread compositions were injected into cans and pressurized using convention can filler equipment. The filler had a long nozzle that depresses the platform (plunger) in the can, and then fills the upper chamber of the can with spread composition from the bottom up. Next, the product is transmitted to a capper/energizer system that seals a nozzle on the top of the can, and injects nitrogen into the bottom chamber of the can and then seals it. The filled and pressurized cans which were then cooled to about 110° F. or lower in a can cooler over a 20 minute period. The cooled cans were then placed in refrigerated storage overnight.

A conventional peanut butter (i.e., the same peanut butter used to prepare compositions 1-3) also was packaged in pressurized containers. The pressurized cans containing compositions 1-3 and the control peanut butter were stored at ambient temperature (about 70° F.). The pressurized cans with the control peanut butter leaked oil through the value and had oil visibly running down the exterior sides of the pressurized cans after only one day of storage. This observation confirmed that the control peanut butter, when put under pressure, rapidly separated into a solids mass and an overlying oil layer that seeped out of the can. None of the pressurized cans containing inventive peanut spread product experienced oil seepage from the cans during storage over a 36 week period. After this 36 week storage period, the pressurized cans containing the inventive peanut spread products were tested by actuating the valve on a can of each one of the different formulations of packaged spread products. In all these tests of the inventive products, a smooth stream of the peanut spread composition was discharged from the valve of the pressurized can; the compositions had similar organoleptic attributes of appearance, mouthfeel and flavor as a conventional smooth peanut butter and no visible oil separation.

Example 2

A chocolate spread composition was prepared having the formulation indicated in Table 2. The ingredients of this spread composition were combined in a kettle and packaged similar to shown in FIG. 3 and described in the Example 1 with the general proviso that the chocolate liquor replaced the peanut butter of Example 1.

TABLE 2

Chocolate Spread Composition

| Ingredient | Amount (%) |
|---|---|
| chocolate liquor | 25.0 |
| whey protein | 9.3 |
| water and steam | 42.1 |
| monosodium phosphate | 0.5 |
| disodium phosphate | 2.4 |
| sorbic acid | 0.3 |
| salt | 0.4 |
| emulsifier (PANODAN ® DATEM) | 0.5 |
| anhydrous milkfat | 4.4 |
| sugar | 14.1 |
| vanilla | 1.0 |
| | 100 |

The resulting chocolate liquor-composition contained about 44.4 percent water, about 0.9 percent whey protein, about 4.4 percent other protein, about 19 percent fat, and about 7 percent lactose with essentially no casein. The resulting chocolate spread composition could be dispensed from pressurized cans as a coherent, spreadable, rich chocolate-tasting bead without oil separation.

While the invention has been particularly described with specific reference to particular process and product embodiments, it will be appreciated that various alterations, modifications and adaptions may be based on the present disclosure, and are intended to be within the spirit and scope of the present invention as defined by the following claims.

What is claimed is:

1. Edible spread composition in a pressurized container comprising, as a homogenous mixture, about 10 to about 45 percent plant fiber-containing material comprising peanut butter, about 0.5 to about 10 percent edible oil, about 10 to about 60 percent water, about 1 to about 20 percent dairy protein concentrate, and a sufficient amount of an emulsifier that inhibits the edible oil from separating from the mixture when the mixture is stored in a pressurized container, wherein the edible spread composition has a density greater than about 1.05 g/ml when discharged from the pressurized container.

2. The edible spread composition of claim 1, wherein the emulsifier is about 0.05 to about 2 percent of the homogenous mixture.

3. The edible spread composition of claim 1, wherein the emulsifier comprises diacetyl tartaric acid esters of monoglycerides.

4. The edible spread composition of claim 3, wherein the emulsifier is at least about 0.2 percent of the homogenous.

5. The edible spread composition of claim 1, wherein the emulsifier comprises polyoxyethylene-(20)-sorbitan-monostearate.

6. The edible spread composition of claim 5, wherein the emulsifier is at least about 0.1 percent of the homogenous.

7. The edible spread composition of claim 1, further comprising about 1 to about 25 percent dairy product, and about 5 to about 20 percent sweetener.

8. The edible spread composition of claim 1, wherein the density is about 1.15 to about 1.3 g/ml when the edible spread composition is discharged from the pressurized container.

9. Peanut spread composition in a pressurized container comprising, as a homogenous mixture, about 10 to about 45 percent peanut butter, about 1 to about 20 percent dairy protein concentrate, about 0.05 to about 2 percent oil, separation-inhibiting emulsifier, about 0.5 to about 10 percent edible oil, about 5 to about 15 percent sweetener, and about 10 to about 60 percent water, wherein the peanut spread composition has a density greater than about 1.05 g/ml when discharged from the pressurized container and wherein the separation-inhibiting emulsifier is effective to inhibit oil separation in the peanut butter component during storage in the pressurized container.

10. A packaged spread product comprising an edible spread composition held in a container under a positive pressure force which can be controllably discharged from the container, wherein the edible spread composition comprises a homogenous mixture including about 10 to about 45 percent plant fiber-containing material comprising peanut butter, about 0.5 to about 10 percent edible oil, about 10 to about 60 percent water, about 1 to about 20 percent dairy protein concentrate, and a sufficient amount of an emulsifier that inhibits the edible oil from separating from the mixture when discharged from the container, wherein the edible spread composition has a density greater than about 1.05 g/ml when discharged from the container.

11. The packaged spread product of claim 10, wherein separation of the peanut butter and oil is inhibited for at least about 12 weeks at a temperature of about 0 to about 120° F., while the edible spread composition is stored under the positive pressure force.

12. The packaged spread product of claim 10, wherein the positive pressure force ranges from about 10 to about 150 psig.

13. The packaged spread product of claim 10, wherein the positive pressure force ranges from about 20 to about 140 psig.

14. The packaged spread product of claim 10, wherein the emulsifier comprises diacetyl tartaric acid esters of monoglycerides.

15. The packaged spread product of claim 10, wherein the edible spread composition comprises at least 10 percent peanut butter, and at least about 0.2 percent emulsifier.

16. The packaged spread product of claim 10, wherein the emulsifier comprises polyoxyethylene-(20)-sorbitan-monostearate.

17. The packaged spread product of claim 10, wherein the edible spread composition comprises at least 10 percent peanut butter and at least about 0.1 percent emulsifier.

18. The packaged spread product of claim 10, wherein the density is about 1.15 to about 1.3 g/ml when the edible spread composition is discharged from the container.

19. The packaged spread product of claim 10, wherein the container comprises a hollow cylindrical body having opposite longitudinal ends, a pressurized gas-containing chamber, an edible spread composition-containing chamber, and a floating plunger slidably arranged inside the cylindrical body, wherein the plunger separates the pressurized gas-containing chamber from the edible spread composition-containing chamber, wherein the pressurized gas-containing chamber contains a pressurized gas creating a pneumatic pressure force against a side of the floating plunger opposite to the edible spread composition-containing chamber; and a closure member included at a longitudinal end of the container including a passageway extending from the edible spread composition-containing chamber to an outside atmosphere, wherein the closure member has a normally closed position to prevent flow of edible spread composition through the passageway but, when actuated, permits flow through the passageway to discharge the edible spread composition.

20. The packaged spread product of claim 19, wherein the container further includes a dome-shaped top section attached to the longitudinal end of the cylindrical body defining the composition-containing chamber, wherein the closure member includes a valve which, when tilted, discharges the edible spread composition from the container, and when tilting force is released the valve returns to the normally closed position; and a bottom section attached to the opposite longitudinal end of the cylindrical body defining the pressurized-containing chamber which includes a plug that seals an opening through which pressurized gas can be introduced into the pressurized gas-containing chamber.

21. The packaged spread product of claim 10, wherein the positive pressure force is applied constantly to the edible spread composition during storage of the peanut spread product.

22. The packaged spread product of claim 10, wherein oil separation is inhibited for at least about 12 weeks storage.

23. The packaged spread product of claim 10, wherein the edible spread composition comprises about 10 to about 45 percent peanut butter, about 0.05 to about 2 percent oil-separation inhibiting emulsifier, about 0.5 to about 10 percent edible oil, and about 10 to about 60 percent water.

24. The packaged spread product of claim 10, wherein the edible spread composition comprises about 10 to about 45 percent peanut butter, about 1 to about 20 percent dairy protein concentrate, about 0.05 to about 2 percent oil-separation inhibiting emulsifier, about 0.5 to about 10 percent edible oil, about 5 to about 15 percent sweetener, and about 10 to about 60 percent water.

* * * * *

UNITED STATES PATENT AND TRADEMARK OFFICE
CERTIFICATE OF CORRECTION

PATENT NO. : 7,498,050 B2 Page 1 of 1
APPLICATION NO. : 10/736037
DATED : March 3, 2009
INVENTOR(S) : Kincaid et al.

It is certified that error appears in the above-identified patent and that said Letters Patent is hereby corrected as shown below:

- On the title page, item (56), Col. 2, Line 1 (Other Publications), delete "Everyting" and insert -- Everything --.

- On the title page, item (57), Col. 2, Line 9 (Abstract), delete "also is" and insert -- is also --.

- In Col. 14, Line 67, Claim 4, delete "homogenous." and insert -- homogenous mixture. --.

- In Col. 15, Line 5, Claim 6, delete "homogenous" and insert -- homogenous mixture. --.

Signed and Sealed this

Twenty-eighth Day of April, 2009

JOHN DOLL
*Acting Director of the United States Patent and Trademark Office*

UNITED STATES PATENT AND TRADEMARK OFFICE
CERTIFICATE OF CORRECTION

PATENT NO. : 7,498,050 B2
APPLICATION NO. : 10/736037
DATED : March 3, 2009
INVENTOR(S) : Kincaid et al.

Page 1 of 1

It is certified that error appears in the above-identified patent and that said Letters Patent is hereby corrected as shown below:

On the cover page,

[*] Notice: Subject to any disclaimer, the term of this patent is extended or adjusted under 35 USC 154(b) by 399 days Delete the phrase "by 399 days" and insert -- by 393 days --

Signed and Sealed this

Fifteenth Day of September, 2009

David J. Kappos
*Director of the United States Patent and Trademark Office*